US 6,694,960 B2

(12) United States Patent
Hess et al.

(10) Patent No.: US 6,694,960 B2
(45) Date of Patent: Feb. 24, 2004

(54) METHOD AND ARRANGEMENT FOR DETERMINING CYLINDER-INDIVIDUAL DIFFERENCES OF A CONTROL VARIABLE IN A MULTI-CYLINDER INTERNAL COMBUSTION ENGINE

(75) Inventors: Werner Hess, Stuttgart (DE); Klaus Ries-Mueller, Bad Rappenau (DE)

(73) Assignee: Robert Bosch GmbH, Stuttgart (DE)

( * ) Notice: Subject to any disclaimer, the term of this patent is extended or adjusted under 35 U.S.C. 154(b) by 48 days.

(21) Appl. No.: 09/958,541

(22) PCT Filed: Jan. 24, 2001

(86) PCT No.: PCT/DE01/00272

§ 371 (c)(1),
(2), (4) Date: Nov. 30, 2001

(87) PCT Pub. No.: WO01/59282

PCT Pub. Date: Aug. 16, 2001

(65) Prior Publication Data

US 2003/0047166 A1 Mar. 13, 2003

(30) Foreign Application Priority Data

Feb. 11, 2000 (DE) .......................................... 100 06 161

(51) Int. Cl.$^7$ .............................................. F02D 41/00
(52) U.S. Cl. ...................................... 123/673; 123/436
(58) Field of Search ................................ 123/673, 436; 73/116, 118.2, 118.1

(56) References Cited

U.S. PATENT DOCUMENTS

| 4,478,185 A | * | 10/1984 | Obayashi et al. ...... 123/406.23 |
| 5,377,654 A | * | 1/1995 | LoRusso et al. ............ 123/673 |
| 5,515,828 A | | 5/1996 | Cook et al. |
| 5,548,514 A | * | 8/1996 | Hasegawa et al. .......... 701/103 |
| 5,654,501 A | * | 8/1997 | Grizzle et al. ............ 73/118.2 |
| 5,720,260 A | * | 2/1998 | Meyer et al. ............... 123/436 |
| 5,861,553 A | | 1/1999 | Janetzke et al. |
| 6,273,062 B1 | * | 8/2001 | Bayerl ........................ 123/336 |
| 6,325,056 B1 | * | 12/2001 | Weining et al. ............. 123/673 |

FOREIGN PATENT DOCUMENTS

| DE | 198 28 279 | 12/1999 |
| DE | 198 59 018 | 6/2000 |
| EP | 0 140 065 | 5/1985 |
| EP | 0 833 043 | 4/1998 |
| JP | 63 021338 | 1/1988 |
| JP | 10 037727 | 2/1998 |
| WO | WO 01 04465 | 1/2001 |

OTHER PUBLICATIONS

"Development of the High Performance L4 Engine ULEV System" by N. Kishi et al, SAE 980415, 1998.

* cited by examiner

Primary Examiner—Mahmoud Gimie
(74) Attorney, Agent, or Firm—Walter Ottesen

(57) ABSTRACT

The invention relates to a method as well as an arrangement for determining cylinder-individual differences of a control variable in a multi-cylinder internal combustion engine. It is provided that a determination of cylinder-individual charge differences is carried out.

14 Claims, 1 Drawing Sheet

US 6,694,960 B2

METHOD AND ARRANGEMENT FOR DETERMINING CYLINDER-INDIVIDUAL DIFFERENCES OF A CONTROL VARIABLE IN A MULTI-CYLINDER INTERNAL COMBUSTION ENGINE

FIELD OF THE INVENTION

The invention relates to a method as well as an arrangement for determining cylinder-individual differences of a control variable in a multi-cylinder internal combustion engine.

BACKGROUND OF THE INVENTION

Ever higher requirements are imposed on modern internal combustion engines, for example, with respect to the smooth running and a reduction of the toxic substance emission. These requirements should be satisfied for all load conditions of the engine. The various load conditions result essentially from the actual operating situation while considering a requirement for the reduction or increase of the torque made available by the engine. A primary task of the control for the internal combustion engine is to adjust the torque generated thereby and for this purpose, in different component systems of the control, variables, which influence the torque, are controlled.

A central control variable of modern engine controls is the so-called charge which is influenced in the component system "charge control". In the sense of this application, the term "charge" means essentially the mass of unconsumed oxygen which is available for the combustion. The charge is also characterized as air charge. In addition to the charge control, a precise control of the mixture composition is required, that is, the fuel enrichment in the air/fuel mixture. The air/fuel mixture ratio is characterized by the air ratio $\lambda$ which indicates the ratio between the supplied air quantity, which determines the charge, and the theoretical air requirement for complete combustion. Accordingly, $\lambda=1$ corresponds to an ideal value with the view to an optimal, residual-free combustion; whereas, values $\lambda<1$ correspond to an air deficiency or a rich mixture and values $\lambda>1$ correspond to an air excess or a lean mixture. In the component system "mixture formation" of the control, the fuel mass, which corresponds to a charge, is computed and the required injection time and the optimal injection time point are determined therefrom. Finally, a properly timed ignition of the mixture affects the course of the combustion.

Various suggestions have already been made to carry out an optimized engine control for internal combustion engines having cylinder-individual fuel metering, especially for engines having direct injection of fuel into the combustion chambers of the individual cylinders. Accordingly, it is, for example, known that manufacturing tolerances in the manufacture of injection valves lead to cylinder-individual mixture differences in operation especially for spark-ignition engines having fuel direct injection. These mixture differences become manifest in different torque contributions of the individual cylinders to the total torque of the engine. This can lead to rough engine running. This problem can be solved by adapting or equalizing the cylinder-individual torque contributions. Individual contributions of the individual cylinders to the rough running are determined via suitable measures and the cylinder-individual torque contributions are so controlled that the cylinder-individual rough running values approach a common desired value. An example of such an engine control is described in U.S. Pat. No. 4,688,535. Another example is disclosed in DE 198 28 279.

It has already also been suggested to improve the engine control with respect to the optimization of the toxic substance discharge. For this purpose, a cylinder-individual lambda control is discussed, for example, in the publication "Development of the High Performance L4 Engine ULEV System" of N. Kishi et al in SAE 980415, starting at page 27. This cylinder-individual lambda control is intended to control the lambda ratio value $\lambda$ of the individual cylinders to the same optimal value for each cylinder in order to make possible a toxic substance optimized combustion individually for each cylinder.

SUMMARY OF THE INVENTION

A method according to the invention as well as an arrangement according to the invention for determining cylinder-individual differences of a control quantity in a multi-cylinder internal combustion engine are characterized in that cylinder-individual charge differences are determined. The invention thereby permits an access to a command variable, namely, the charge of the individual cylinders compared to the charge of the other cylinders. The command variable essentially codetermines the combustion and the operation of the engine. The possibility presented by the invention of recognizing or determining cylinder-individual charge differences permits a consideration of the charge differences when computing other cylinder-individual engine variables as well as, if required, a correction of cylinder-individual charge differences for their equalization. These engine variables are essentially influenced by the charge. Conventionally only fuel-metering differences had been corrected.

The invention permits also a reliable differentiation as to whether occurring torque differences between individual cylinders are caused essentially by cylinder-individual differences in the charge or cylinder-individual differences in the air ratio $\lambda$ which, as is known, is dependent upon the charge as well as on the corresponding fuel metering.

The result of a determination of cylinder-individual charge differences can, for example, be utilized in order to optimize the ignition angle. The term "ignition angle" relates to the angular position of the ignition time point to a reference point, for example, to the top dead center point of the piston of a cylinder in its combustion stroke. In this way, improvements can be achieved compared to conventional knock controls. If an engine has the possibility of a cylinder-individual control of the air metering (for example, cylinder-individual throttle flaps), then determined cylinder-individual charge differences can, in accordance with the invention, be utilized directly to control this throttle flap and therefore to equalize the cylinder charges. This is especially advantageous for asymmetric engine geometries wherein, because of construction (for example, because of different dimensioning of the induction lines for the individual cylinders), high cylinder-individual charge differences can occur. The cylinder-individual charge differences can, however, also be utilized to optimize the injection time points.

A preferred embodiment provides that the determination of the cylinder-individual charge differences can be carried out with an equation which contains, as a variable, the cylinder-individual air ratio $\lambda$ and cylinder-individual torque contributions. In this way, it is possible with the determination of cylinder-individual charge differences, to omit a measurement of the individual cylinder charges so that installing corresponding sensors is not necessary. Rather, it is sufficient when suitable units are provided for the cylinder-individual torque detection or determination and for cylinder-individual detection or determination of the air ratio and when corresponding signals of these units are suitably combined. This simple computation of cylinder-individual charge differences is based, inter alia, on the recognition that essentially two influence quantities are decisive for a torque outputted by a cylinder, namely, on the one hand, the mentioned charge, that is, the oxygen mass which is available for the combustion and, on the other hand, the mixture composition indicated by the $\lambda$ value in which, in addition to the mass of combustion oxygen, also the supplied fuel mass is included. A comparatively slight dependence of the torque on the ignition angle which may possibly be given is not considered in this first approximation. These contributions are negligible especially in stratified operation of the engine.

A preferred further embodiment is characterized in that an equalization of the cylinder-individual air mass is carried out via a suitable equalization control and that, thereupon, cylinder-individual torque differences can be determined by direct measurement or indirect derivation and that the cylinder-individual charge differences are derived from the cylinder-individual torque differences. Here, it is assumed that, for the same $\lambda$ values in all cylinders, possibly present differences in the torque outputs of the individual cylinders are caused by different charges of the corresponding cylinders. Especially, it is assumed that there is a direct proportionality between cylinder-individual torque and cylinder-individual charge. The cylinder-individual $\lambda$ control is advantageously carried out to a value $\lambda=1$ with a view to a minimum toxic substance discharge.

The determination of cylinder-individual torque differences required for this variation can be carried out in any possible way, for example, in that the torque contributions of individual cylinders to the total torque or variables, which are in direct relationship to these contributions, are measured by suitable sensors. For example, suitable combustion pressure sensors or torque sensors can be provided. Such expensive measurements can be omitted when the determination of cylinder-individual torque differences is carried out based on an evaluation of the rough running of the engine. All suitable methods and/or apparatus can be utilized for this purpose, for example, the method for cylinder equalization described in U.S. Pat. No. 4,688,535 wherein segment times are detected to evaluate the time-dependent trace of the rotational movement of the crankshaft or camshaft and, from this, an index for the rough running of the engine is formed. An improvement of this method is disclosed in DE 198 28 279. It is also possible to utilize rough running values which are anyway provided for the control for a possibly present combustion misfire detection. The formation of rough running values for combustion misfire detection is, for example, known from U.S. Pat. No. 5,861,553. The features of these publications, which relate to the formation of rough running values and the derivation of cylinder-individual torque contributions, are expressly included in this application.

It can also be that the cylinder-individual torque contributions are equalized by a corresponding control, for example, by cylinder-specific injection times and that, thereupon, cylinder-individual differences of the $\lambda$ value are determined. For controls having the possibility of the above-mentioned equalization of the $\lambda$ values, corresponding cylinder-individual lambda values are anyway present as input values of a control. Alternatively, or in addition, separate measuring devices can also be provided (for example, individual lambda probes) for measuring the individual lambda values. The cylinder-individual charge differences can then be derived from the cylinder-individual differences of the air ratio (for essentially equal torque contributions of the individual cylinders). This derivation is based on the assumption that, at least in a first approximation, the supplied fuel mass (contained in the air ratio $\lambda$) is directly proportional to the outputted torque of the cylinder.

BRIEF DESCRIPTION OF THE DRAWING

The invention will now be described with reference to the single FIGURE of drawing which shows a preferred embodiment of the method of the invention for determining cylinder-individual charge differences in the form of a schematic flowchart.

Figure 1:
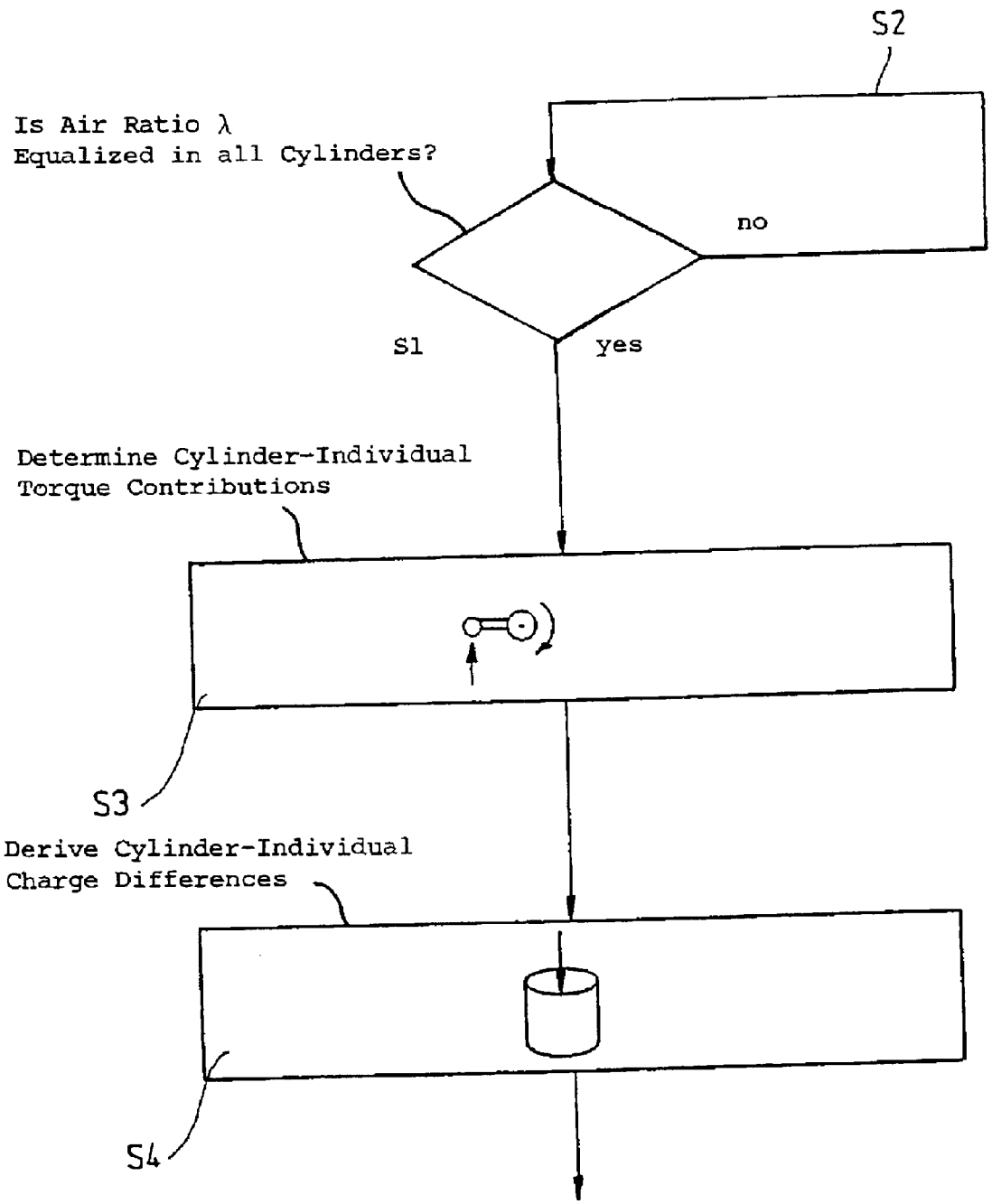

DESCRIPTION OF THE PREFERRED
EMBODIMENTS OF THE INVENTION

The method explained with respect to FIG. 1 is for the determination of cylinder-individual charge differences and is implemented in the form of suitable software and/or hardware in an electronic engine control for an internal combustion engine. The engine can, for example, be a spark injection engine having gasoline direct injection. In addition to other functions, the control apparatus is also configured to make available a cylinder equalization of the cylinder-individual torques on the basis of rough running values of the engine. For this, individual contributions of the individual cylinders to the rough running of the engine are determined by suitable measures and the cylinder-specific injection times and therefore the cylinder-individual torque contributions are so controlled that the cylinder-individual rough running values approach a common desired value. An example of an engine control of this kind is described in U.S. Pat. No. 4,688,535. Another example is disclosed in DE 198 28 279. Reference is expressly made to disclosure of these documents with respect to the equalization of the cylinder-individual torque contributions.

Rough running signals are formed for the cylinder equalization control with respect to the torque contributions. These rough running signals represent real, cylinder-individual angular acceleration contributions of the individual cylinders to the total torque. These angular acceleration contributions are detected from the evaluation of the time-dependent trace of the rotational movement of the crankshaft or camshaft with the aid of so-called segment times. Segment times are the times in which the crankshaft or camshaft passes over a predetermined angular region which is assigned to a specific cylinder. The more even the engine runs, the less are the differences between the segment times of the individual cylinders. An index for the rough running of the engine can be formed from the above-mentioned segment times. By a suitable evaluation, the cylinder-individual injection quantities or injection times can be so adjusted that the cylinder-individual torque contributions adapt to each other, preferably, up to the equalization of the torque contributions. For the understanding of the present invention, it is above all important to recognize that in a control of this kind, signals are also generated which represent cylinder-individual torque contributions or their ratios to each other. A control of this kind therefore offers the possibility of a derivation of values of cylinder-individual torque contributions.

The control includes also a cylinder equalization control which permits the cylinder-individual air ratios $\lambda$ to be controlled to a common value, preferably to the value $\lambda=1$. This cylinder-individual lambda control functions essentially for the improvement of exhaust gas of the internal combustion engine. The control can operate so that, via corrections with respect to the fuel injection, the cylinder-individual λ values are controlled to a common value. The cylinder-individual lambda control can, as noted in the above-mentioned publication "Development of the High Performance . . . " operate likewise with an evaluation of rpm fluctuations of the engine for indicating cylinder-individual mixture composition differences. Accordingly, rough running values can, for example, be formed for this purpose with the aid of segment times.

In an internal combustion engine equipped with a control of this kind, the method can, for example, run as follows (see the drawing). At a given start time point, the cylinder-individual lambda control is active. In a first step S1, a determination is made as to whether the cylinder-individual lambda control functions effectively in such a manner that the air ratio λ is essentially equalized in all cylinders. For this purpose, the air ratios of the individual cylinders can be measured with the aid of cylinder-individual lambda probes, for example. If the cylinder-individual lambda control is not yet so far into steady state that the cylinder-individual lambda values are matched to each other within a pregivable narrow range, then, preferably after a predetermined time interval, a check is again made as to whether the cylinder-individual lambda control is at steady state (step S2).

If the cylinder-individual lambda control is at steady state, then, in step S3, a determination of cylinder-individual torque contributions of the individual cylinders is made. This determination can, for example, include the measurement of cylinder-individual torques by suitable torque sensors and/or the measurement of cylinder-individual combustion chamber pressures by suitable sensors. The torque contributions can be derived from the individual combustion chamber pressures via the cylinder geometry. Such measurements and corresponding sensors are not needed when the control of the engine includes a cylinder equalization control for the cylinder-individual torque contributions of the kind described initially herein. In this case, signals, which represent the cylinder-individual torque contributions, are anyway present as input signals of this control and can be utilized for determining individual cylinder torques. All the above explanations lead to the situation that, at the end of step S3, values for the cylinder-individual torque contributions or at least relative ratios or differences between the torque contributions of individual cylinders are present.

These values serve as input quantities for step S4 wherein cylinder-individual charge differences are derived from the different cylinder contributions of the individual cylinders. This derivation is based on the assumption that the detected different torques have their origin essentially exclusively in the different charge, that is, in the different content of combustible oxygen. Stated otherwise, a direct proportionality between the torque contribution and the charge present in this cylinder is assumed. It is therefore assumed that, for essentially the same λ values in all cylinders, possibly existing differences in the torque output of the individual cylinders have their origins in different charges of the corresponding cylinders. At the output of S4, there are therefore values available for cylinder-individual charge differences for the control. These charge differences can be considered in the control for the computation of cylinder-individual engine variables, for example, the correct ignition setting and/or injection time point setting. The cylinder-individual engine variables are influenced by the charge.

It is to be noted that for an engine control which has the possibility of a cylinder-individual lambda control as well as a cylinder-individual torque control, these controls may not be control active simultaneously for pure charge differences because, otherwise, both methods would control against each other. This will be explained in the following example. Cylinder 1 could have an increased charge in relationship to the other cylinders. A cylinder-individual lambda control would thereupon increase the injection quantity of cylinder 1 in order to set the air ratio to the value λ=1. The increased charge will also cause an increased torque output. Correspondingly, a cylinder equalization control for the torque contributions will reduce the injection quantity of cylinder 1 in order to correspondingly reduce the torque. In such a constellation, it is therefore to be noted that the unit for the cylinder equalization control for the torque is not used for control of the injection quantity, but only for the measurement or for the derivation of the cylinder-individual torque contributions. Therefore, no control intervention by the torque equalization control takes place.

In contrast, for pure injection differences, both equalization methods can run in parallel because both methods correct in the same direction. Preferably, only a cylinder-individual lambda control is carried out in this case. It can be assumed that, for an essentially equal charge for all cylinders and a steady state cylinder-individual lambda control, the cylinder-individual torques are also essentially equal.

Because of the determination of the cylinder-individual charge differences as a consequence of the invention, it is possible to consider these charge differences in the optimization of very different control variables for the engine. Thus, it is, for example, possible to correct the ignition angle and/or the injection time point of the individual cylinders for each cylinder individually. This can mean that the ignition angle and/or the injection time point is precontrolled in the optimal range. In this way, there results a greater torque and a possibly present knock control need be less active. Also, a fully variable control of inlet valves and/or outlet valves is possible in dependence upon the cylinder-individual charge differences. In this way, the invention can be utilized, if required, for the substantially free cylinder-individual adjustment of the valve stroke and/or valve control times. This can be realized in that each individual valve is assigned its own drive which can, for example, be electromechanical. This electromechanical control can be controlled by the engine control. In this case, it would also be possible to correct or equalize detected charge differences by a cylinder-individual control of the valves. This can, for example, take place in that a cylinder with the charge, which is the largest because of the engine asymmetry, becomes somewhat less charged so that, in the result, all cylinders essentially supply the same torque component. This contributes to an improved smooth running of the engine. A corresponding correction of the charge would also be possible for the use of individual throttle flaps, that is, one throttle flap per cylinder.

What is claimed is:

1. A method for determining cylinder-individual differences of a control variable in a multi-cylinder internal combustion engine, the method comprising the step of determining cylinder-individual charge differences wherein the determination of cylinder-individual charge differences is carried out based on an equation which contains, as variables, cylinder-individual air ratios and cylinder-individual torque contributions.

2. A method for determining cylinder-individual differences of control variable in a multi-cylinder internal combustion engine, the method comprising the steps of:

determining cylinder-individual charge differences;

equalizing cylinder-individual air ratios;

determining cylinder-individual torque differences; and, deriving said cylinder-individual charge differences from the cylinder-individual torque differences.

3. The method of claim 2, wherein said cylinder-individual air ratios are equalized in such a manner that a value of $\lambda=1$ is set for each cylinder; and, said cylinder-individual charge differences are derived under the assumption of a proportionality between the cylinder-individual torque differences and the cylinder-individual charge differences.

4. The method of claim 3, wherein, for determining cylinder-individual torque differences, a cylinder-individual measurement of cylinder-individual outputted torque and/or of cylinder-individual combustion chamber pressures is carried out.

5. The method of claim 2, wherein the determination of the cylinder-individual torque differences is carried out indirectly based on an evaluation of the smooth running of the engine.

6. A method for determining cylinder-individual differences of a control variable in a multi-cylinder internal combustion engine, the method comprising the steps of:

determining cylinder-individual charge differences;

equalizing cylinder-individual torque contributions;

determining cylinder-individual air ratio differences; and, deriving said cylinder-individual charge differences from the cylinder-individual air ratios.

7. The method of claim 6, wherein said cylinder-individual charge differences are derived under the assumption of a proportionality between the cylinder-individual air ratio differences and the cylinder-individual charge differences.

8. The method of claim 7, wherein a cylinder-individual measurement of cylinder-individual air ratios is carried out for determining cylinder-individual air ratio differences.

9. The method of claim 7, wherein input signals of control arrangement for equalizing cylinder-individual air ratios is utilized for determining cylinder-individual air ratio differences.

10. An arrangement for determining cylinder-individual differences of a control variable in a multi-cylinder internal combustion engine, the arrangement comprising:

means for determining cylinder-individual charge differences; and, said means for determining cylinder-individual charge differences operating by means of an equation which contains cylinder-individual air ratios and cylinder-individual torque contributions as variables.

11. An arrangement for determining cylinder-individual differences of a control variable in a multi-cylinder internal combustion engine, the arrangement comprising:

means for determining cylinder-individual charge differences means for equalizing cylinder-individual air ratios;

means for determining cylinder-individual torque differences for equalized air ratios; and, means for deriving cylinder-individual charge differences from the cylinder-individual torque differences.

12. The arrangement of claim 11, wherein said means for equalizing cylinder-individual air ratios equalizes said cylinder-individual air ratios in such a manner that a value $\lambda=1$ is set for each cylinder; and, said deriving means derives said cylinder-individual charge differences from said cylinder-individual torque differences under the assumption of proportionality between the cylinder-individual torque differences and the cylinder-individual charge differences.

13. An arrangement for determining cylinder-individual differences of a control variable in a multi-cylinder internal combustion engine, the arrangement comprising:

means for determining cylinder-individual charge differences;

means for equalization of cylinder-individual torque contributions;

means for determining cylinder-individual air ratio differences for equalized torque contributions; and, means for deriving cylinder-individual charge differences from the cylinder-individual air ratio differences.

14. The arrangement of claim 13, wherein said deriving means derives said cylinder-individual charge differences from said cylinder-individual air ratio differences by assuming proportionality between the cylinder-individual air ratio differences and the cylinder-individual charge differences.

* * * * *